United States Patent [19]
Fong

[11] Patent Number: 5,349,371
[45] Date of Patent: Sep. 20, 1994

[54] ELECTRO-OPTICAL MOUSE WITH MEANS TO SEPARATELY DETECT THE CHANGES IN CONTRAST RATIO IN X AND Y DIRECTIONS

[76] Inventor: Kwang-Chien Fong, 5F, No. 3, Lane 359, Sec. 2, Chung Shan Rd., Chung Ho City, Taipei Hsien, Taiwan

[21] Appl. No.: 22,384

[22] Filed: Feb. 24, 1993

Related U.S. Application Data

[63] Continuation of Ser. No. 709,829, Jun. 4, 1991, abandoned.

[51] Int. Cl.⁵ .............................................. G09G 3/00
[52] U.S. Cl. ................................... 345/166; 250/221
[58] Field of Search ............... 340/710, 706, 709, 707; 250/221; 273/148 B; 178/18, 19; 345/166, 163, 156, 165, 157

[56] References Cited

U.S. PATENT DOCUMENTS

| | | | |
|---|---|---|---|
| 4,390,873 | 6/1983 | Kirsch | 340/710 |
| 4,647,771 | 3/1987 | Kato | 340/710 |
| 4,880,968 | 11/1989 | Kwang-Chien | 340/710 |
| 4,935,619 | 6/1990 | Heberle | 340/710 |

FOREIGN PATENT DOCUMENTS 0009720 1/1986 Japan ................................. 340/710

*Primary Examiner*—Ulysses Weldon
*Assistant Examiner*—Doon Chow
*Attorney, Agent, or Firm*—Lowe, Price, LeBlanc & Becker

[57] ABSTRACT

An electro-optical mouse includes two light sources to respectively project light onto a grid of lines on a reflective surface; two cylindrical lenses at right angles to each other to respectively amplify the X and Y line crossings; two detectors to respectively receive the output light signals from the two cylindrical lenses via two reflectors and, generate electrical signals according to the sensed changes in contrast ratio, in order to accurately control the movement of a cursor on the visual display of a computer.

1 Claim, 4 Drawing Sheets

ELECTRO-OPTICAL MOUSE WITH MEANS TO SEPARATELY DETECT THE CHANGES IN CONTRAST RATIO IN X AND Y DIRECTIONS

This application is a continuation of application Ser. No. 07/709,829 filed Jun. 4, 1991, now abandoned.

BACKGROUND OF THE INVENTION:

The present invention relates to electro-optical mouses and relates more particularly to an electro-optical mouse which includes a light source to project light on a grid of lines on a reflective surface, a cylindrical lens to amplify the reflected image and send amplified signals corresponding to X-lines to a first detector and amplified signals corresponding to Y-lines to a second detector, and a microprocessor for processing, corresponding signals from said first and second detectors control the movement of a cursor associated with a visual display system.

Conventionally, a mouse which is used to move or position the cursor or part of the display of a computer system is generally operated through mechanical transmission. It is generally comprised of a rolling ball disposed at the bottom and driven to rotate in a direction and amount corresponding to movement of a joy-stick and therefore, convert translational motion into a position signal for controlling the movement of the cursor or part of the display in a computer system. The main disadvantage of the mechanical mouse is its high error rate. Further, the rolling ball may wear off easily causing severe error.

Recently, electro-optical technology has been applied in manufacturing electro-optical mouses for controlling the movement of the cursor in a visual display more efficiently and accurately. An electro-optical mouse generally comprises at least one light source to project light on a grid of lines on a reflective surface and at least one detector for interpreting the position of the housing thereof over the grid of lines. Translational motion of the housing is further converted into a position signal by a transducer for controlling the movement of the cursor.

According to the known structures of electro-optical mouses, a single lens and a single detector may be used to detect light changes in X and Y directions through two ways. In a first way, the lines on the grid are made with optically transmissive inks and are illuminated by a dual color monochromatic light source so that the moving direction of the housing can be effectively distinguished by the detector according to the wavelength of the reflected light. In a second way, the X and Y directions,are detected through different lenses, namely, the X lines are made on the top edge of the reflective surface while the Y lines are made on the bottom edge thereof and, separate lenses are provided at different focal distances for detecting the reflection from the X lines and the Y lines separately. In the electro-optical mouses which utilize a single lens and single detector for X and Y detection, the line crossings in the X direction may interfere with the line crossings in the Y direction to affect the accurate control of a cursor. The present invention is to utilize cylindrical lenses to amplify line crossings in the X and Y directions separately so that the changes contrast ratio can be more effectively sensed by the detectors and interference problems between X and Y line crossings can be eliminated.

DETAILED DESCRIPTION OF THE PREFERRED EMBODIMENT:

Referring to the annexed drawings in greater detail, an electro-optical mouse in accordance with the present invention is generally comprised of housing 1, light source means, cylindrical lens means, reflector means and detector means.

Housing 1 is provided to cover internal component parts, having a plurality of selector keys at the top for the selection of different functions, and X line signal and Y line signal pick-up devices at the inside which are disposed at right angles to each other.

Light source means includes LEDs 21 and 22 which project light onto the grid of lines on a reflective surface.

Figure 1:
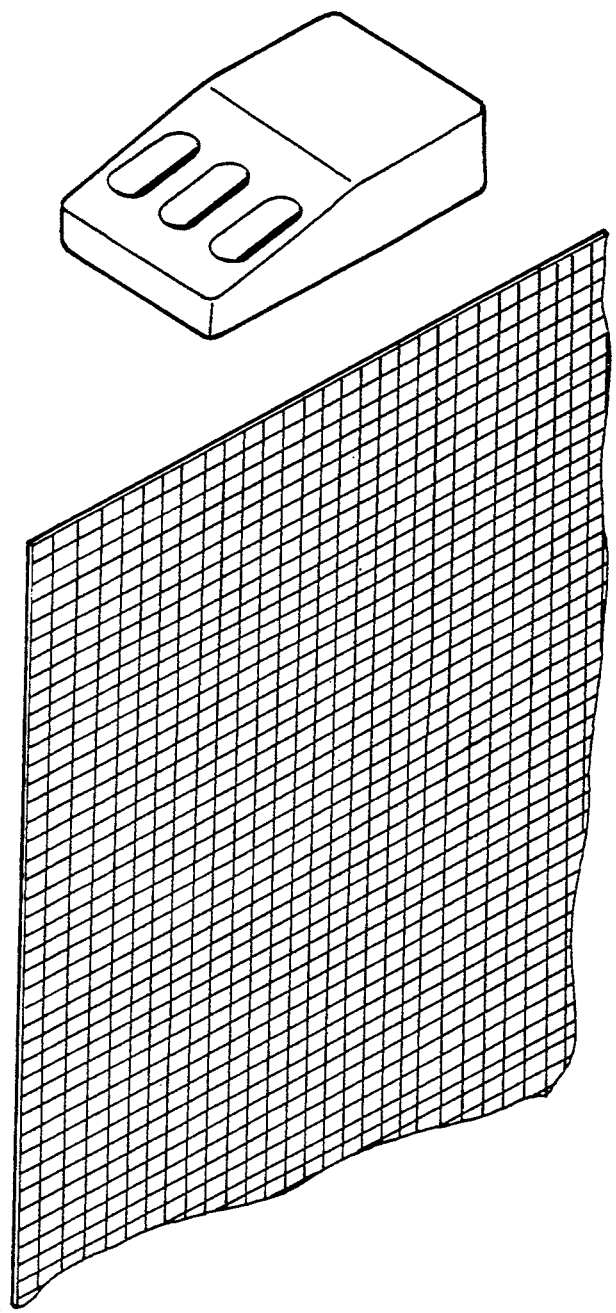
FIG. 1 is a schematic drawing showing the use of the present invention.
Figure 2:
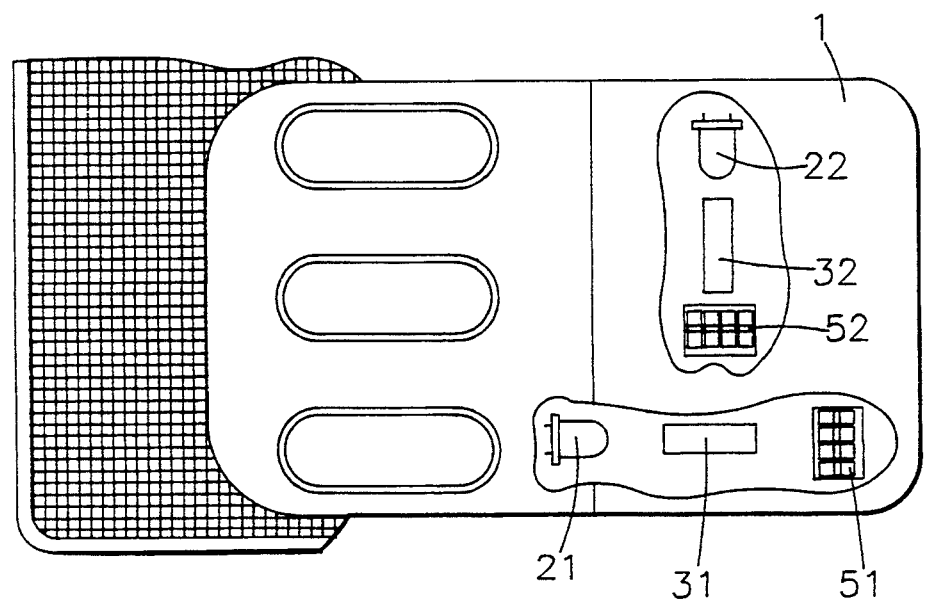
FIG. 2 is a top view and a sectional side view of the preferred embodiment of the present invention.
Figure 2:
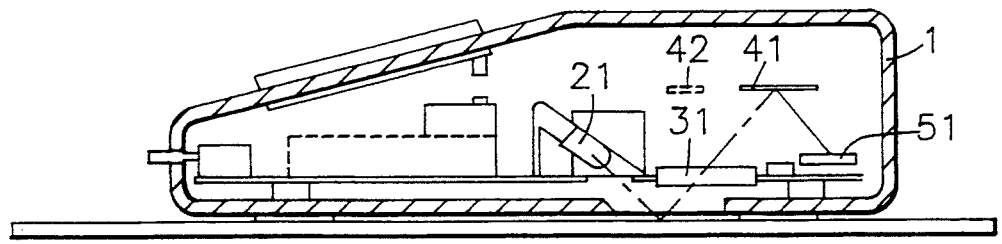
Figure 3:
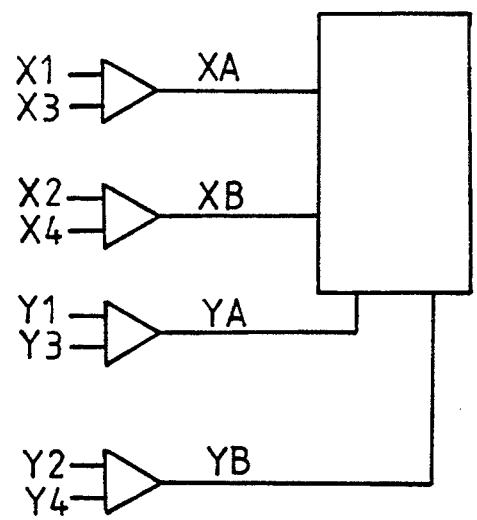
FIG. 3 is an electronic signal processing system chart according to the present invention.
Figure 4:
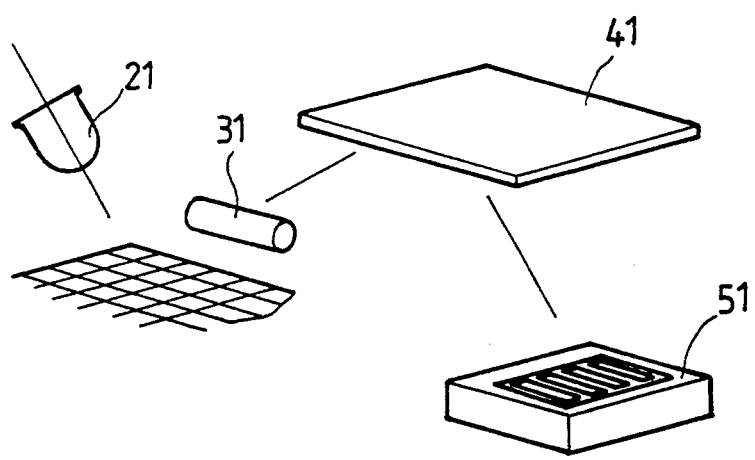
FIG. 4 illustrates the operation of the present invention.
Figure 5:
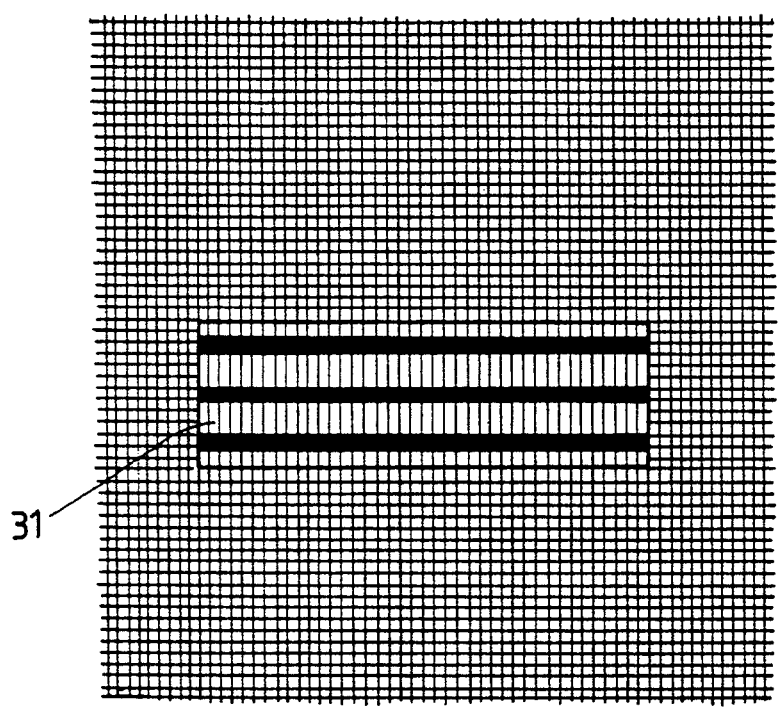
FIG. 5 illustrates the manner in which line crossings in parallel with the central axis of the cylindrical lens are amplified.

The cylindrical lens means includes a first cylindrical lens 31 disposed in a X direction and a second cylindrical lens 32 disposed in a Y direction to respectively amplify the image of X or Y lines obtained from the grid of lines on the reflective surface, i.e., each cylindrical lens 31 or 32 amplify only the line crossings which are in parallel with the central axis thereof (see FIG. 5). By means of the cylindrical lenses 31 and 32, the detector means can efficiently precisely sense the changes in contrast ratio in X or Y direction and accurately generates electrical signals representing the line crossings.

The reflector means includes a first reflector 41 (in the X direction) and a second reflector 42 (in the Y direction) respectively disposed between and above the cylindrical lens means and the detector means to reflect the light from the cylindrical lens means to the detector means.

The detector means includes a first detector 51 to sense any reflected light signal from the first reflector 41 and a second detector 52 to sense any reflected light signal from the second reflector 42. While moving the mouse, the changes in contrast ratio are detected by the detectors 51 and 52 which, after through a logic operation, generate corresponding electric signals to a computer to accurately control the movement of a cursor.

What is claimed is:

1. An electro-optical mouse, comprising a first signal pick-up device for detecting, in an X direction, changes in contrast ratio of a reflective surface caused by passage of the first signal pick-up device over a grid of lines on the reflective surface in the X direction and second pick-up device for detecting, in a Y direction, changes in contrast ratio of the reflective surface caused by passage of the second signal pick-up device over said grid of lines in Y direction, said first and second signal pick-up devices comprising light source means including an LED light source for projecting light onto said reflective surface, lens means including a cylindrical lens for amplifying light reflected from said surface, reflector means including a reflector for transmitting light from said cylindrical lens to a detector, said detector including means for generating an electrical signal sensed changes in contrast ratio in order to enable a computer to accurately control the movement of a cursor on a visual display the central axes of said cylindrical lenses being oriented at right angles to each other to separately amplify changes in said contrast ratio on the X and Y direction each lens amplifying only the line crossing of said grid of lines which are disposed parallel to the central axis thereof.

* * * * *